US009632734B2

(12) United States Patent
Ehrhardt et al.

(10) Patent No.: US 9,632,734 B2
(45) Date of Patent: Apr. 25, 2017

(54) SPINDLE SUPPORTED NEAR FIELD COMMUNICATION DEVICE

(71) Applicant: ZIH Corp., Lincolnshire, IL (US)

(72) Inventors: Robert Ehrhardt, Palatine, IL (US); Robert S. Gawelczyk, Chicago, IL (US); Derek J. Hampson, Mundelein, IL (US); Dan Monnier, Arlington Heights, IL (US); James M. Rehberger, Franklin, WI (US); Mark B. Urban, Mundelein, IL (US)

(73) Assignee: ZIH Corp., Lincolnshire, IL (US)

( * ) Notice: Subject to any disclaimer, the term of this patent is extended or adjusted under 35 U.S.C. 154(b) by 0 days.

(21) Appl. No.: 14/642,589

(22) Filed: Mar. 9, 2015

(65) Prior Publication Data

US 2016/0162229 A1      Jun. 9, 2016

Related U.S. Application Data

(63) Continuation-in-part of application No. 14/565,381, filed on Dec. 9, 2014.

(51) Int. Cl.
*G06F 3/12*      (2006.01)
*B41J 15/02*     (2006.01)
(Continued)

(52) U.S. Cl.
CPC .............. *G06F 3/1236* (2013.01); *B41J 3/44* (2013.01); *B41J 15/02* (2013.01); *G06F 3/1211* (2013.01);
(Continued)

(58) Field of Classification Search
None
See application file for complete search history.

(56) References Cited

U.S. PATENT DOCUMENTS 6,109,800 A * 8/2000 Suzuki ............. B41J 2/005
347/172
2002/0191998 A1  12/2002 Cremon
(Continued)

FOREIGN PATENT DOCUMENTS

EP        2728517 A1     5/2014
JP     2004-322403   *  11/2004   .............. B41J 17/32
(Continued)

OTHER PUBLICATIONS

International Search Report and Written Opinion from corresponding International Patent Application No. PCT/US2015/064381 mailed on Jun. 15, 2016.
(Continued)

*Primary Examiner* — Beniyam Menberu

(57) ABSTRACT

Systems, devices, and related methods for shaping near field interrogation signals are discussed herein. Some embodiments may provide for a spindle supported near field communication (NFC) device including a spindle configured to mount to a mounting surface, and a beam shaping NFC device. The beam shaping NFC device may include: a ferromagnetic component including a core portion, wherein the core portion defines a core cavity and the spindle is inserted within the core cavity; and a wire coil disposed around the core portion. The ferromagnetic component may be configured to concentrate near field interrogation signals generated by the wire coil toward a near field interrogation region and away from the mounting surface, or other components capable of causing interference or degradation of the near field interrogation signals.

19 Claims, 12 Drawing Sheets

(51) Int. Cl.
| | |
|---|---|
| *G06K 15/02* | (2006.01) |
| *G06K 7/10* | (2006.01) |
| *H01Q 7/08* | (2006.01) |
| *H04B 5/00* | (2006.01) |
| *G06K 15/00* | (2006.01) |
| *B41J 3/44* | (2006.01) |
| *G06K 1/12* | (2006.01) |
| *G06K 1/20* | (2006.01) |
| *G06K 17/00* | (2006.01) |
| *H01Q 1/22* | (2006.01) |

(52) U.S. Cl.
CPC ............... *G06K 1/12* (2013.01); *G06K 1/20* (2013.01); *G06K 7/10009* (2013.01); *G06K 15/4025* (2013.01); *G06K 17/00* (2013.01); *H01Q 1/2216* (2013.01); *H01Q 7/08* (2013.01); *H04B 5/0031* (2013.01)

(56) References Cited

U.S. PATENT DOCUMENTS

| | | | | |
|---|---|---|---|---|
| 2003/0128269 | A1* | 7/2003 | Squires | B41J 35/36 347/214 |
| 2004/0233789 | A1* | 11/2004 | Oguchi | G04C 3/008 368/47 |
| 2006/0238600 | A1* | 10/2006 | Vandermeulen | B41J 11/009 347/177 |
| 2007/0040876 | A1 | 2/2007 | Anderson | |
| 2007/0171020 | A1* | 7/2007 | Morimoto | H01F 17/045 336/198 |
| 2007/0274242 | A1* | 11/2007 | Lamacraft | G06K 19/0723 370/310 |
| 2008/0044195 | A1* | 2/2008 | Higashiyama | G03G 21/1657 399/53 |
| 2008/0073457 | A1 | 3/2008 | Milton | |
| 2008/0238799 | A1* | 10/2008 | Tsushima | H01Q 1/2216 343/788 |
| 2008/0297318 | A1 | 12/2008 | Ohashi | |
| 2008/0298822 | A1* | 12/2008 | Tsirline | B41J 3/50 399/23 |
| 2008/0298870 | A1* | 12/2008 | Tsirline | G06K 1/20 400/613 |
| 2009/0027163 | A1* | 1/2009 | Su | G06K 19/07749 340/10.1 |
| 2009/0033581 | A1 | 2/2009 | Ross | |
| 2009/0045919 | A1 | 2/2009 | Fukui | |
| 2009/0121835 | A1* | 5/2009 | Borret | G06K 7/0008 340/10.1 |
| 2009/0184817 | A1 | 7/2009 | Ishizuka | |
| 2010/0219942 | A1* | 9/2010 | Lee | F01D 17/02 340/10.51 |
| 2012/0235636 | A1* | 9/2012 | Partovi | H02J 7/025 320/108 |
| 2013/0256420 | A1* | 10/2013 | Rasanen | G06K 19/07758 235/492 |
| 2014/0253275 | A1* | 9/2014 | Shijo | H01F 27/34 336/105 |
| 2014/0293748 | A1* | 10/2014 | Altman | G01S 3/8083 367/127 |

FOREIGN PATENT DOCUMENTS

| | | | | |
|---|---|---|---|---|
| JP | 2005-094737 | * | 4/2005 | ............... H01Q 7/06 |
| JP | 2010-004429 A | | 1/2010 | |

OTHER PUBLICATIONS

The United States Patent and Trademark Office, "Non-Final Office Action," issued on May 12, 2016 in connection with U.S. Appl. No. 14/565,381.

* cited by examiner

SPINDLE SUPPORTED NEAR FIELD COMMUNICATION DEVICE

CROSS REFERENCE TO RELATED APPLICATIONS

This application is a continuation-in-part of U.S. patent application Ser. No. 14/565,381, titled "Beam Shaping Near Field Communication Device," filed Dec. 9, 2014, which is hereby incorporated by reference herein.

FIELD

The present invention relates to radio frequency identification (RFID) and, in particular, to beam shaping near field communication (NFC) devices capable of concentrating near field interrogation signals at a targeted near field interrogation region within a printer.

BACKGROUND

RFID transponders, either active or passive, are typically used with an RFID transceiver or similar device to communicate information from the transponders. In order to communicate, the transceiver exposes the transponder to a radio frequency (RF) electromagnetic field or signal. In the case of a passive transponder, the RF electromagnetic field energizes the transponder and thereby prompts the transponder to respond to the transceiver by modulating the field in a well-known technique called backscattering. In the case of an active transponder, the transponder may respond to the electromagnetic field by transmitting an independently powered reply signal to the transceiver.

Problems can occur, however, when the RFID transceiver and RFID transponder are confined within the space of an interior housing, such as that of a printer or other apparatus. For example, nearby metallic housing can cause interference and degradation of the magnetically sensitive near field patterns passed between the RFID transceiver and RFID transponder. The interior of the housing may constrain the spatial arrangement of the RFID transceiver and RFID transponder, thus limiting the available space and locations of the near field interrogation region. When the RFID transponder is disposed within the interior of a ribbon supply roll of a printer, the near field interrogation signal may become attenuated when propagating through the ribbon supply roll, and thus more input power is needed for the RFID transceiver to activate the RFID tag. In yet another example, RFID transponders attached to moving elements may have degraded or intermittent communicability with the near field interrogation signals.

BRIEF SUMMARY

Through applied effort, ingenuity, and innovation, solutions to improve such RFID systems have been realized and are described herein. In general, techniques are provided to improve the concentration of near field interrogation signals at targeted near field interrogation regions within an apparatus. Some embodiments may provide for a spindle supported near field communication (NFC) device. The spindle supported NFC device may include a spindle and a beam shaping NFC device. The spindle may be configured to mount to a mounting surface. The beam shaping NFC device may include: ferromagnetic component including a core portion, wherein the core portion defines a core cavity and the spindle is inserted within the core cavity; and a wire coil disposed around the core portion, wherein the ferromagnetic component concentrates near field interrogation signals generated by the wire coil toward a near field interrogation region and away from the mounting surface.

In some embodiments, the near field interrogation signals may maintain communication with a radio frequency identification (RFID) tag while the RFID tag rotates around the spindle and within the near field interrogation region.

In some embodiments, the ferromagnetic component may further include a bottom flange portion that promotes the concentration of the near field interrogation signals away from the surface.

In some embodiments, the ferromagnetic component may include a top flange portion and a bottom flange portion. The wire coil may be disposed directly around the core portion of the ferromagnetic component between the top flange portion and the bottom flange portion.

In some embodiments, the ferromagnetic component may promote the concentration of the near field interrogation signals away from the spindle.

In some embodiments, the beam shaping NFC device further may include a nonconductive bobbin component including a bobbin core portion defining a bobbin cavity. The core portion of the ferromagnetic component may be disposed within the bobbin cavity. The wire coil may be disposed around the bobbin core portion.

In some embodiments, the spindle supported NFC device may further include a ribbon supply spool configured to mechanically attach with a ribbon supply roll. The ribbon supply spool may rotate around the spindle.

In some embodiments, the spindle supported NFC device may further include the ribbon supply roll including an RFID tag. The near field interrogation signals may maintain communication with an RFID tag while the RFID tag rotates around the spindle and within the near field interrogation region.

In some embodiments, the ribbon supply roll may further include: a ribbon supply core; a ribbon; a foil trailer attached to an end of the ribbon, wherein the foil trailer is wrapped around the ribbon supply core and the ribbon is wrapped around foil trailer. The RFID tag may be disposed between the ribbon supply core and the foil trailer. The ferromagnetic component may concentrate the near field interrogation signals generated by the wire coil at the near field interrogation region such that the near field interrogation signals, after propagating through the ribbon and foil trailer, satisfy an activation level of the RFID tag.

In some embodiments, the spindle supported NFC device may further include a bearing component configured to facilitate the rotation of the ribbon supply spool around the spindle rod portion of the spindle. In some embodiments, the bearing component may include: a bushing disposed between the exterior surface of the core cavity of the ferromagnetic component and the spindle; a first washer disposed around the bushing; a second washer disposed around the spindle; and a bearing disposed around the spindle between the bushing and the second washer.

In some embodiments, the ribbon supply spool may define a spool cavity and the beam shaping NFC device may be disposed within the spool cavity. The ribbon supply spool may further define a protective housing for the beam shaping NFC device when the beam shaping NFC device is disposed within the spool cavity.

In some embodiments, the ribbon supply spool may include a hub portion and a spool portion. The spool portion may define a spool cavity and the spindle may be inserted within the spool cavity. The spool portion may further include a fin configured to mechanically secure the ribbon supply roll with the ribbon supply spool.

Some embodiments may provide for a printer. The printer may include a housing and a spindle supported NFC device. The housing may define an interior surface of the printer and the spindle supported NFC device may be mechanically secured with the interior surface. The spindle supported NFC device may include a spindle configured to mount to the interior surface of the printer; and a beam shaping NFC device including: a ferromagnetic component including a core portion, wherein the core portion defines a core cavity and the spindle is inserted within the core cavity; and a wire coil disposed around the core portion. The ferromagnetic component may concentrate near field interrogation signals generated by the wire coil toward a near field interrogation region and away from the interior surface of the printer.

In some embodiments, the near field interrogation signals may maintain communication with an RFID tag located while the RFID tag rotates around the spindle within the near field interrogation region.

In some embodiments, the ferromagnetic component may further include a bottom flange portion. The bottom flange portion of the ferromagnetic component may promote the concentration of the near field interrogation signals away from the interior surface of the printer.

In some embodiments, the ferromagnetic component may include a top flange portion and a bottom flange portion. The wire coil may be disposed directly around the core portion of the ferromagnetic component between the top flange portion and the bottom flange portion.

In some embodiments, the ferromagnetic component may promote the concentration of the near field interrogation signals away from the spindle.

In some embodiments, the beam shaping NFC device may further include a nonconductive bobbin component including a bobbin core portion defining a bobbin cavity. The core portion of the ferromagnetic component may be disposed within the bobbin cavity. The wire coil may be disposed around the bobbin core portion.

In some embodiments, the printer may further include a ribbon supply spool. The ribbon supply spool may be configured to mechanically attach with a ribbon supply roll. The ribbon supply spool may rotate around the spindle. In some embodiments, the printer may further include the ribbon supply roll. The ribbon supply roll may include an RFID tag. The near field interrogation signals may maintain communication with the RFID tag while the RFID tag rotates around the spindle and within the near field interrogation region.

In some embodiments, the ribbon supply roll may further include: a ribbon supply core; a ribbon; and a foil trailer attached to an end of the ribbon. The foil trailer may be wrapped around the ribbon supply core and the ribbon may be wrapped around foil trailer. The RFID tag may be disposed between the ribbon supply core and the foil trailer. The ferromagnetic component may concentrate the near field interrogation signals generated by the wire coil at the near field interrogation region such that the near field interrogation signals, after propagating through the ribbon and foil trailer, satisfy an activation level of the RFID tag.

In some embodiments, the printer may further include a bearing component configured to facilitate the rotation of the ribbon supply spool around the spindle. In some embodiments, the bearing component may include: a bushing disposed between the exterior surface of the core cavity of the ferromagnetic component and the spindle; a first washer disposed around the bushing; a second washer disposed around the spindle; and a bearing disposed around the spindle between the bushing and the second washer.

In some embodiments, the ribbon supply spool may include a hub portion and a spool portion. The spool portion may define a spool cavity and the spindle may be inserted within the spool cavity. The spool portion may further define a fin configured to mechanically secure the ribbon supply roll with the ribbon supply spool.

Some embodiments may provide for a method of interrogating an RFID tag. The method may include: disposing a spindle supported NFC device within an interior surface of a housing of an apparatus, wherein the spindle supported NFC device includes a spindle, a ferromagnetic component, a wire coil, and a ribbon supply spool; attaching a ribbon supply roll with the ribbon supply spool, wherein the ribbon supply roll includes the RFID tag; rotating the ribbon supply roll and the RFID tag around the spindle; energizing a transceiver connected with the wire coil to cause the wire coil to generate near field interrogation signals; and concentrating, with the ferromagnetic component, the near field interrogation signals generated by the wire coil at a near field interrogation region where the RFID tag is located and away from the interior surface of the apparatus.

In some embodiments, the method may further include maintaining communication with an RFID tag via the near field interrogation signals while the RFID tag rotates around the spindle and within the near field interrogation region.

In some embodiments, the method may further include concentrating the near field interrogation signals generated by the wire coil away from the interior surface of the apparatus may include promoting the concentration of the near field interrogation signals away from the spindle.

These characteristics as well as additional features, functions, and details of various embodiments are described below. Similarly, corresponding and additional embodiments are also described below.

BRIEF DESCRIPTION OF THE DRAWINGS

Figure 1:
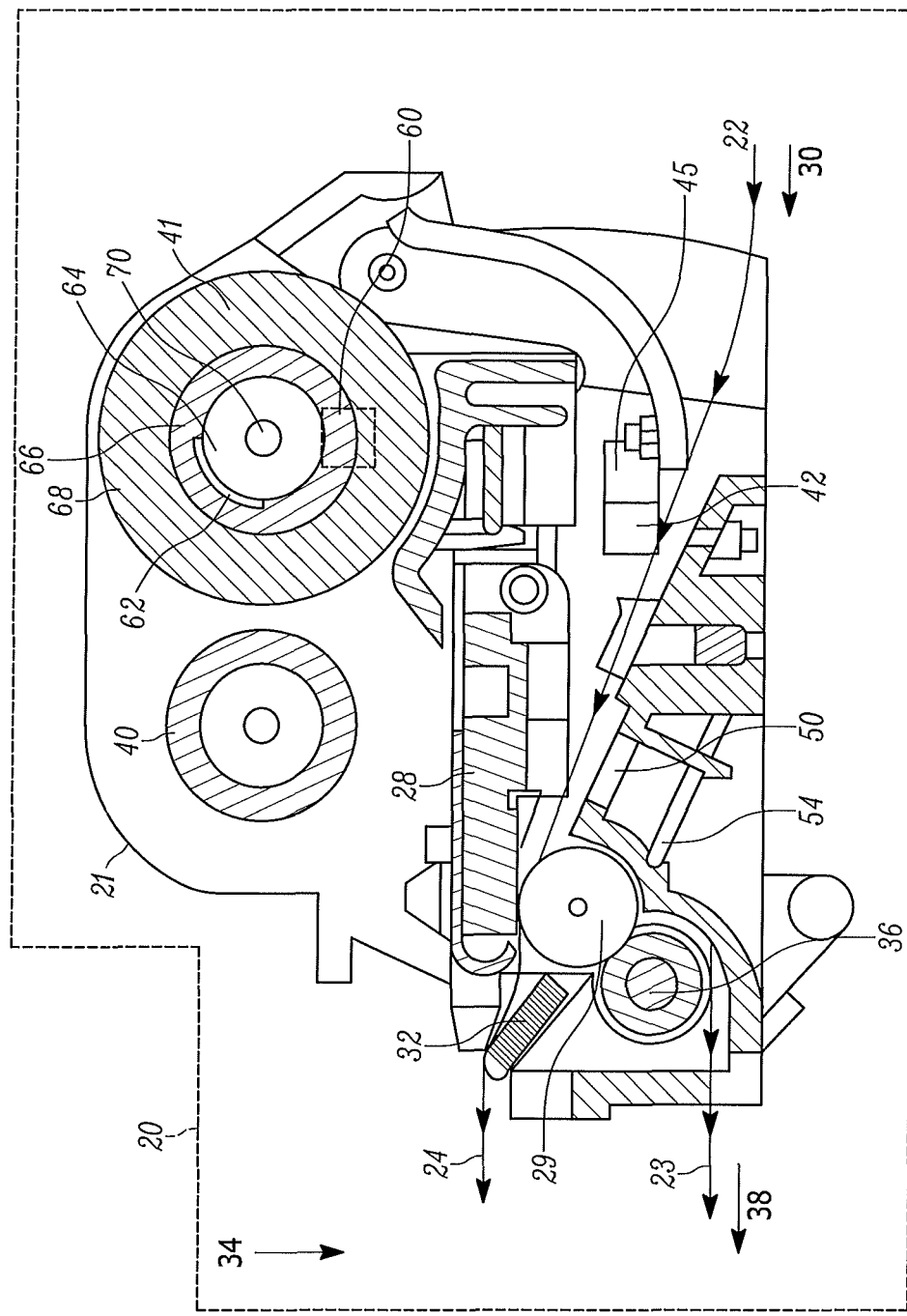
Figure 2A:
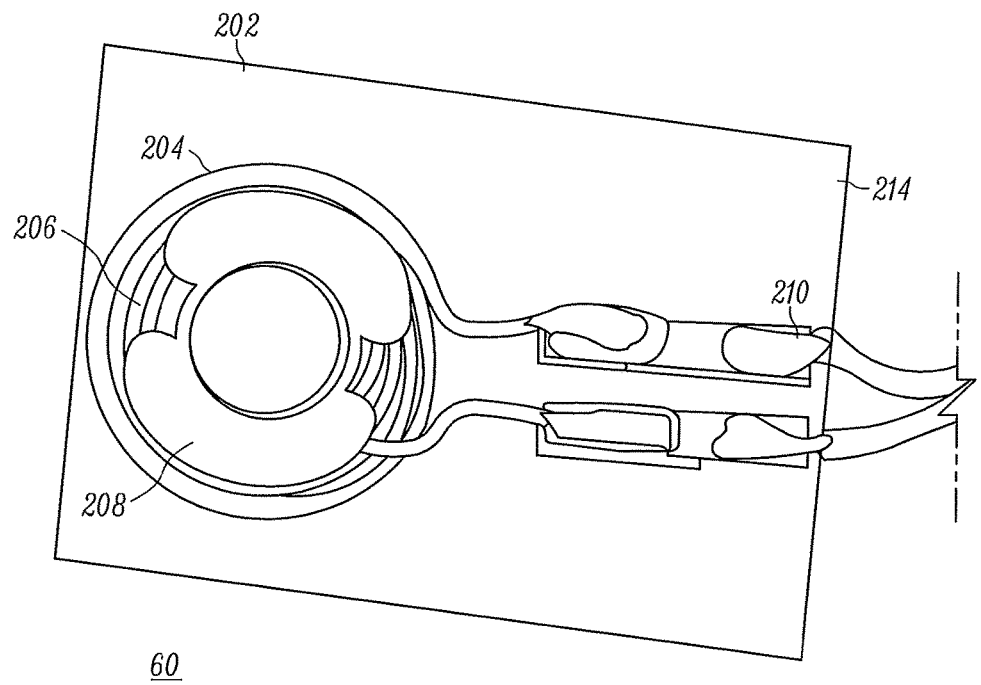
Figure 2B:
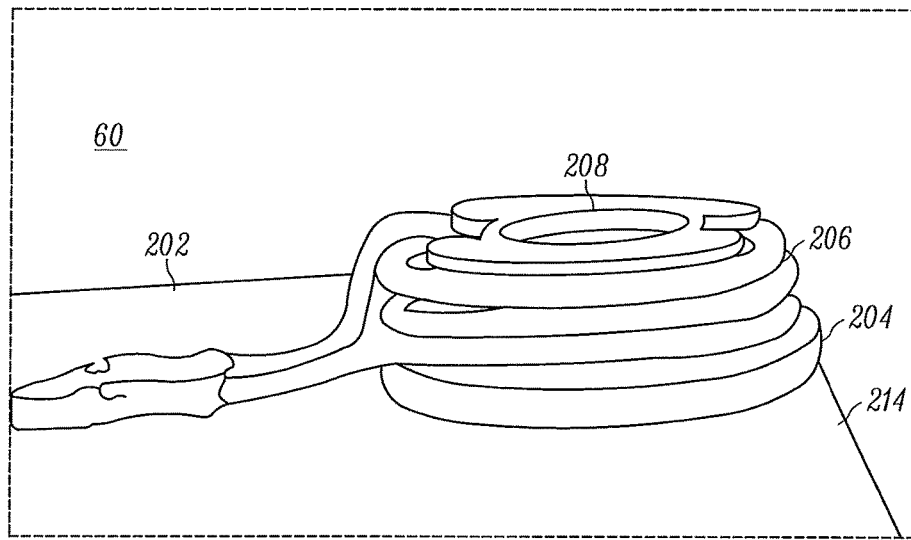
Figure 3:
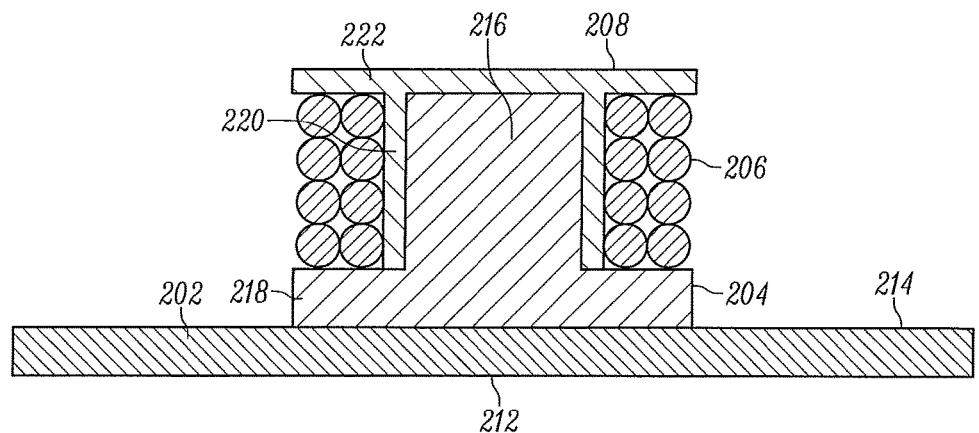
Figure 4:
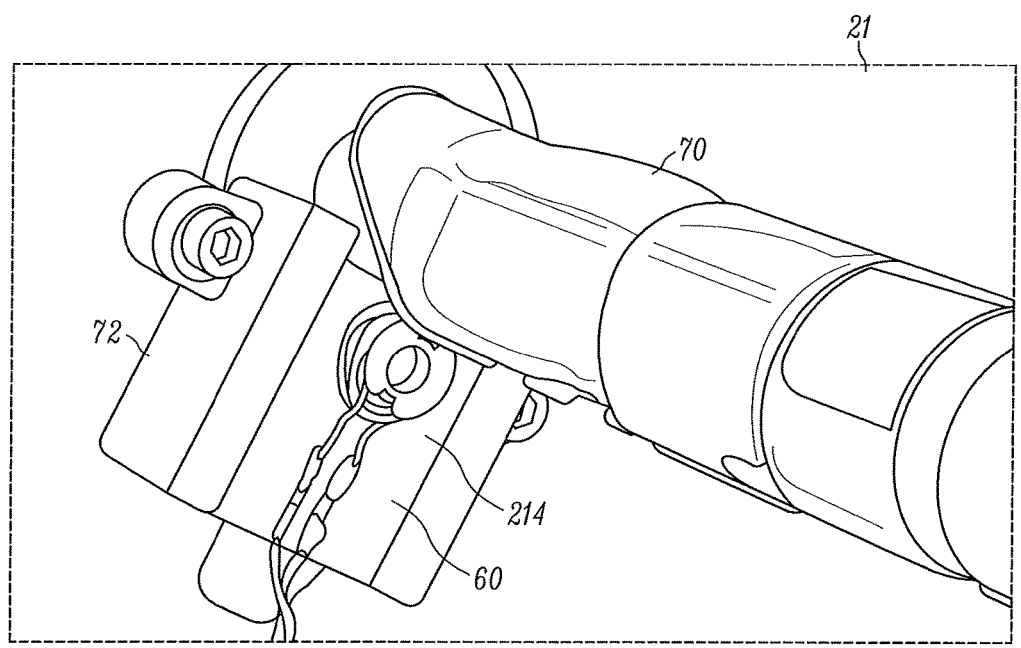
Figure 5:
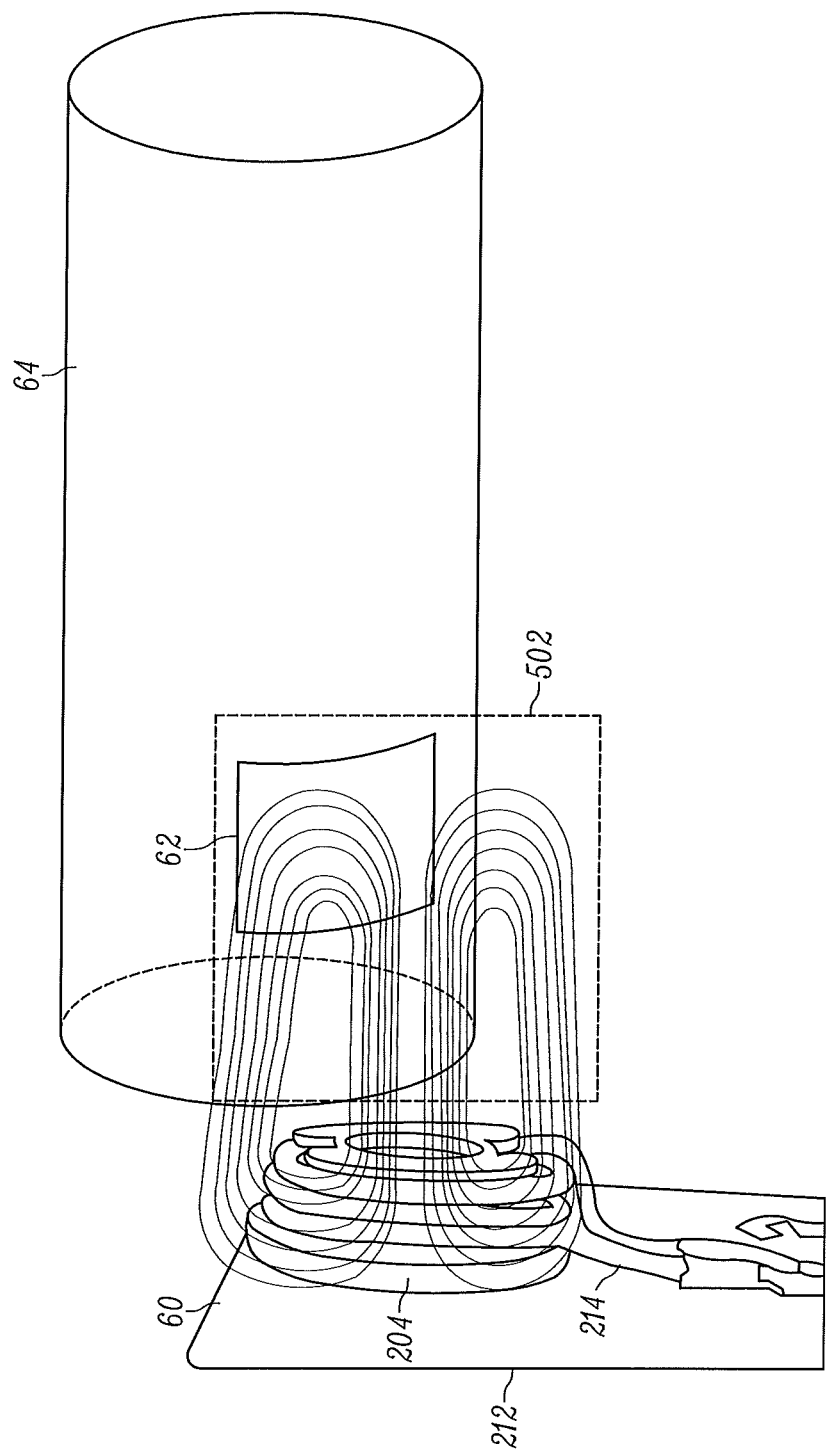
Figure 6:
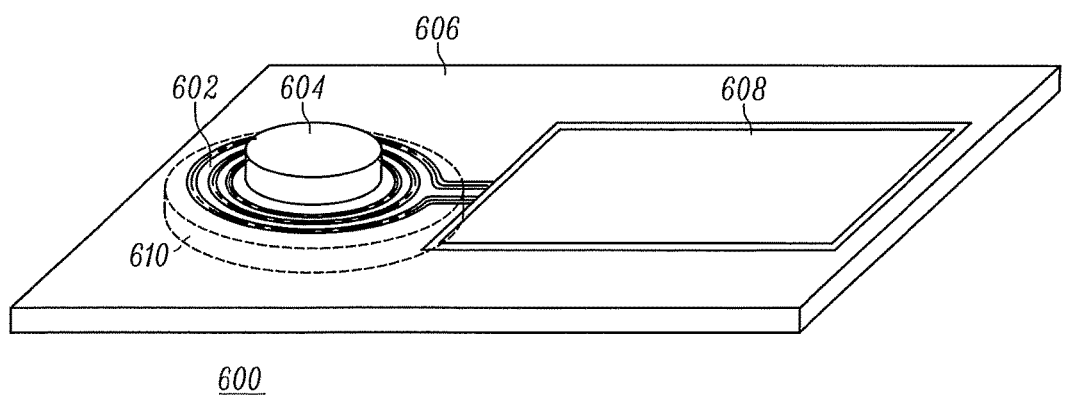
Figure 7:
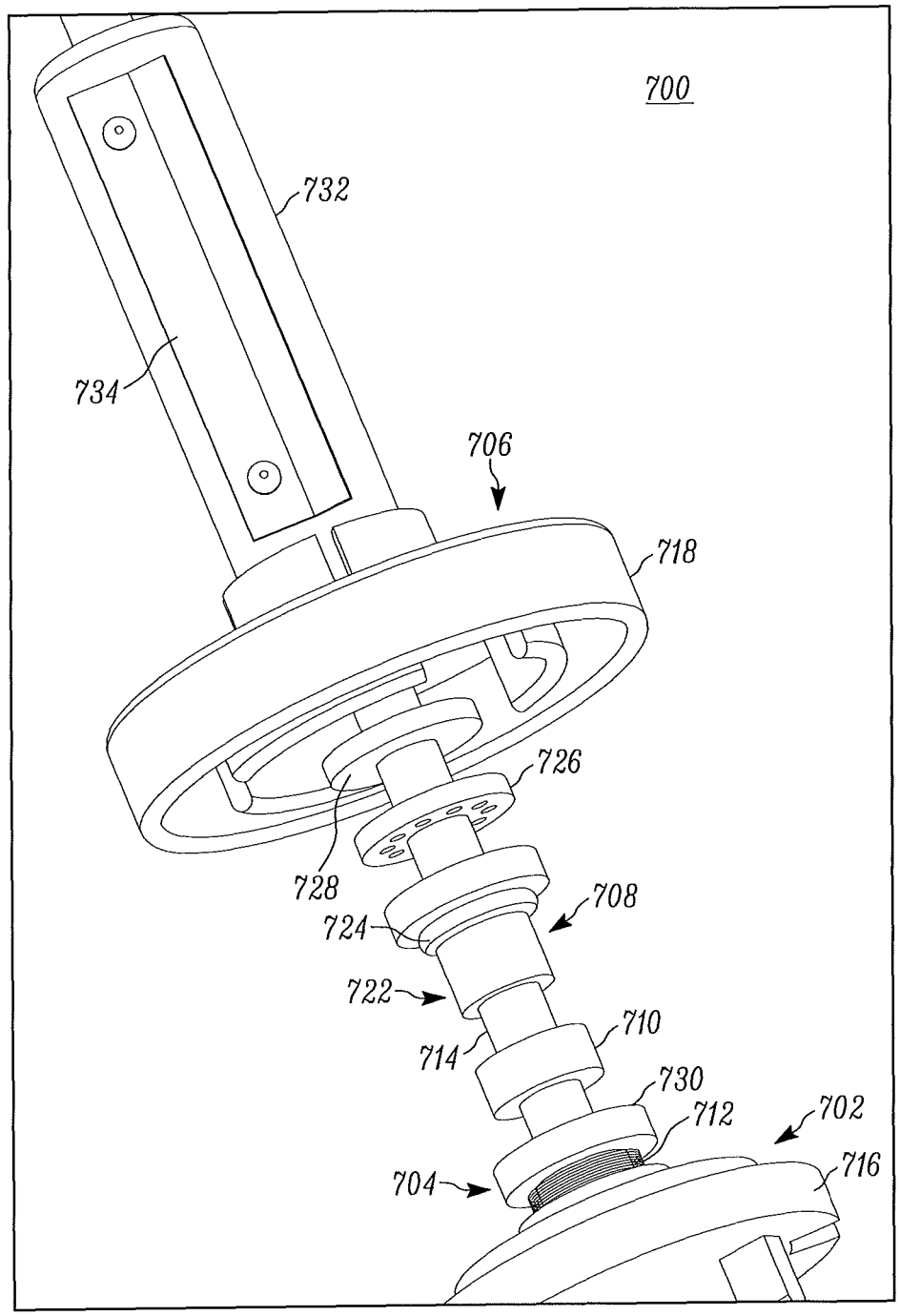
Figure 8:
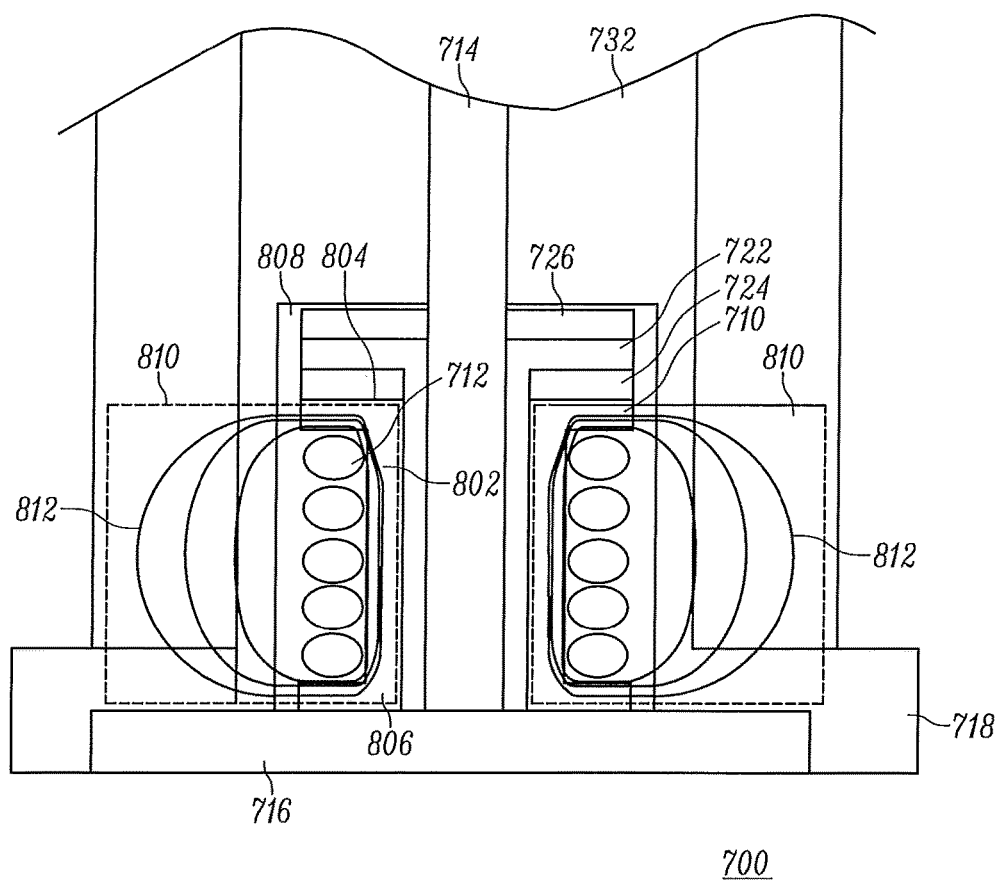
Figure 9:
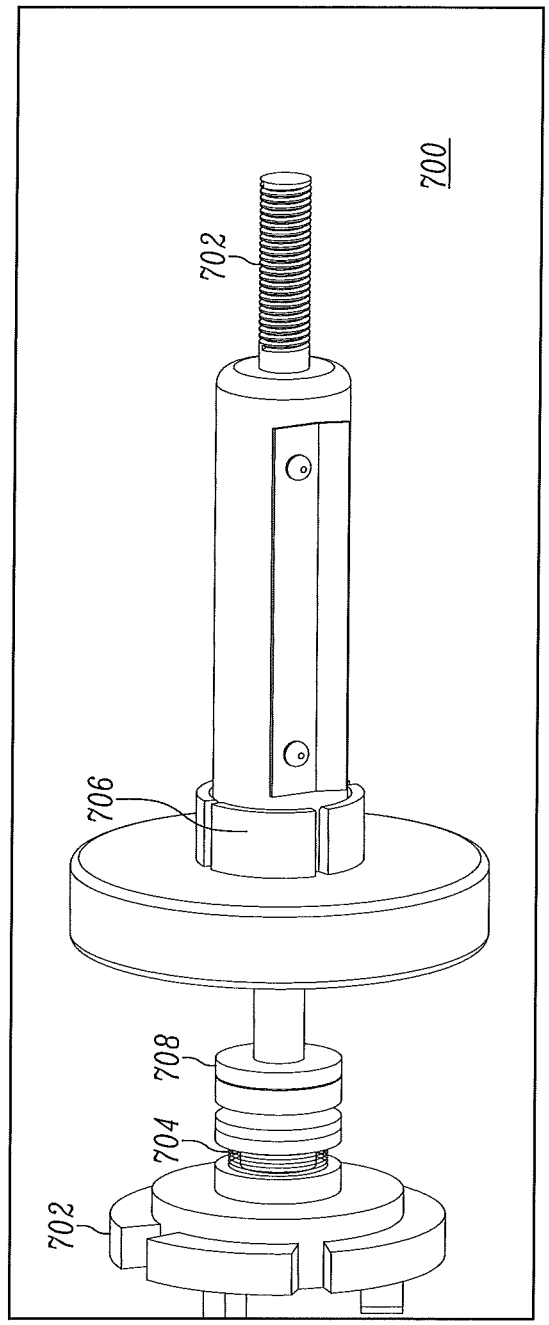
Figure 10:
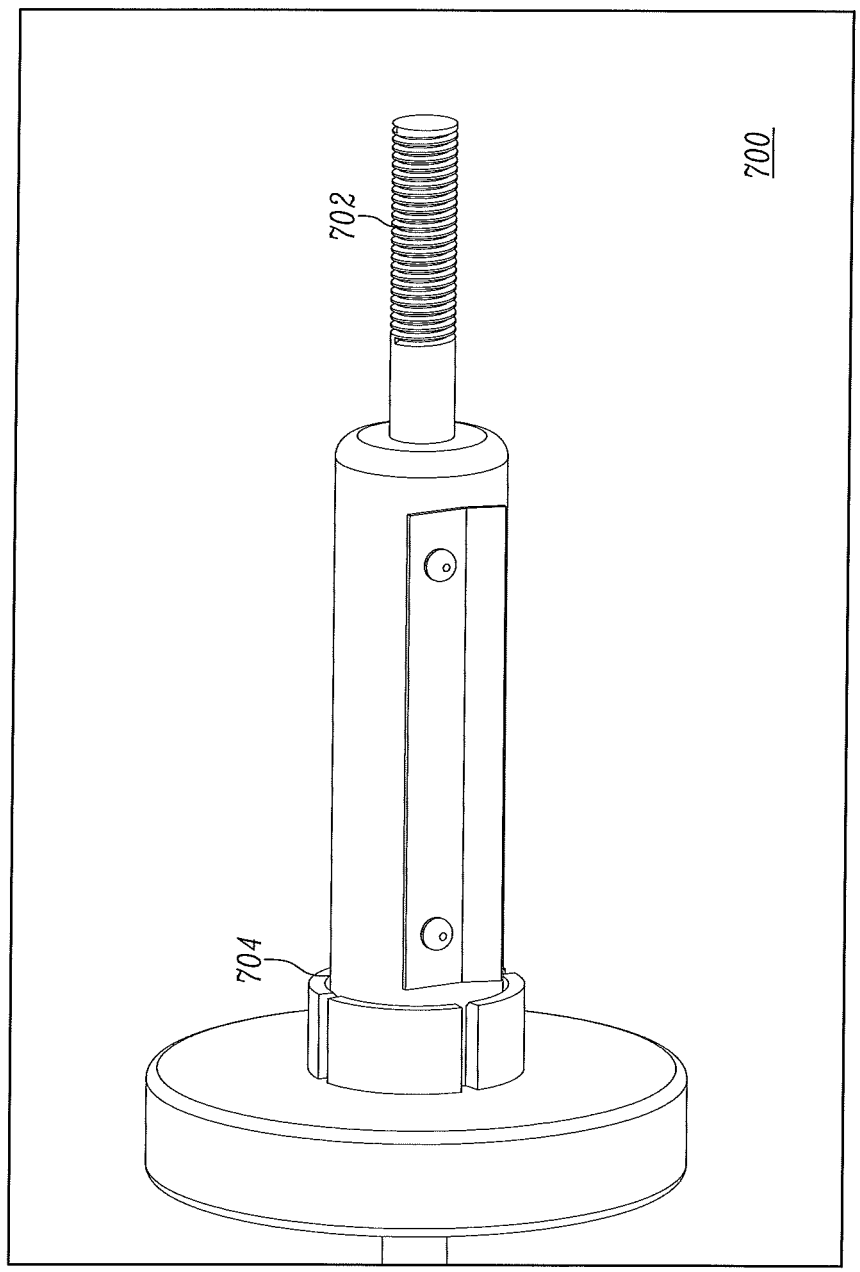
Figure 11:
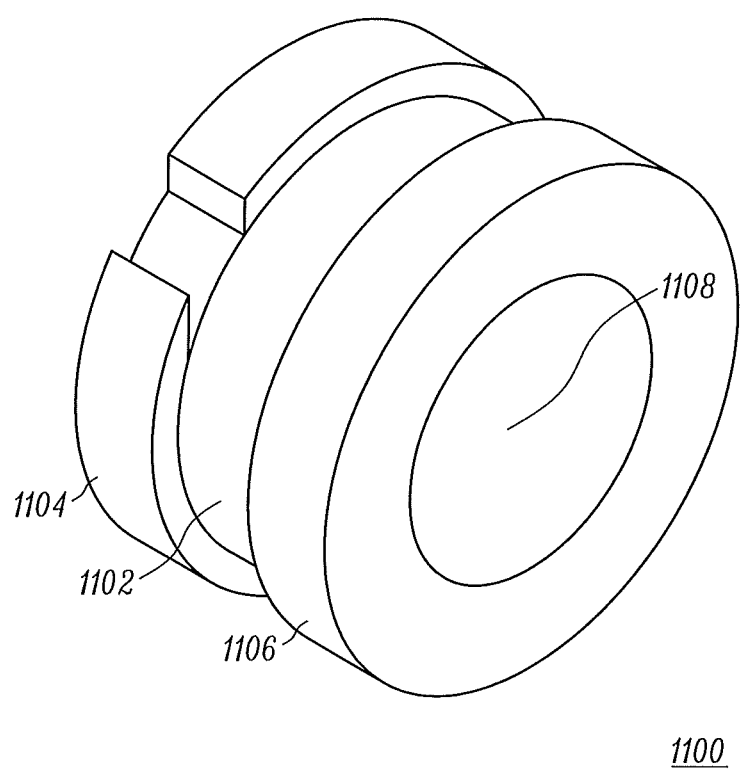
Figure 12:
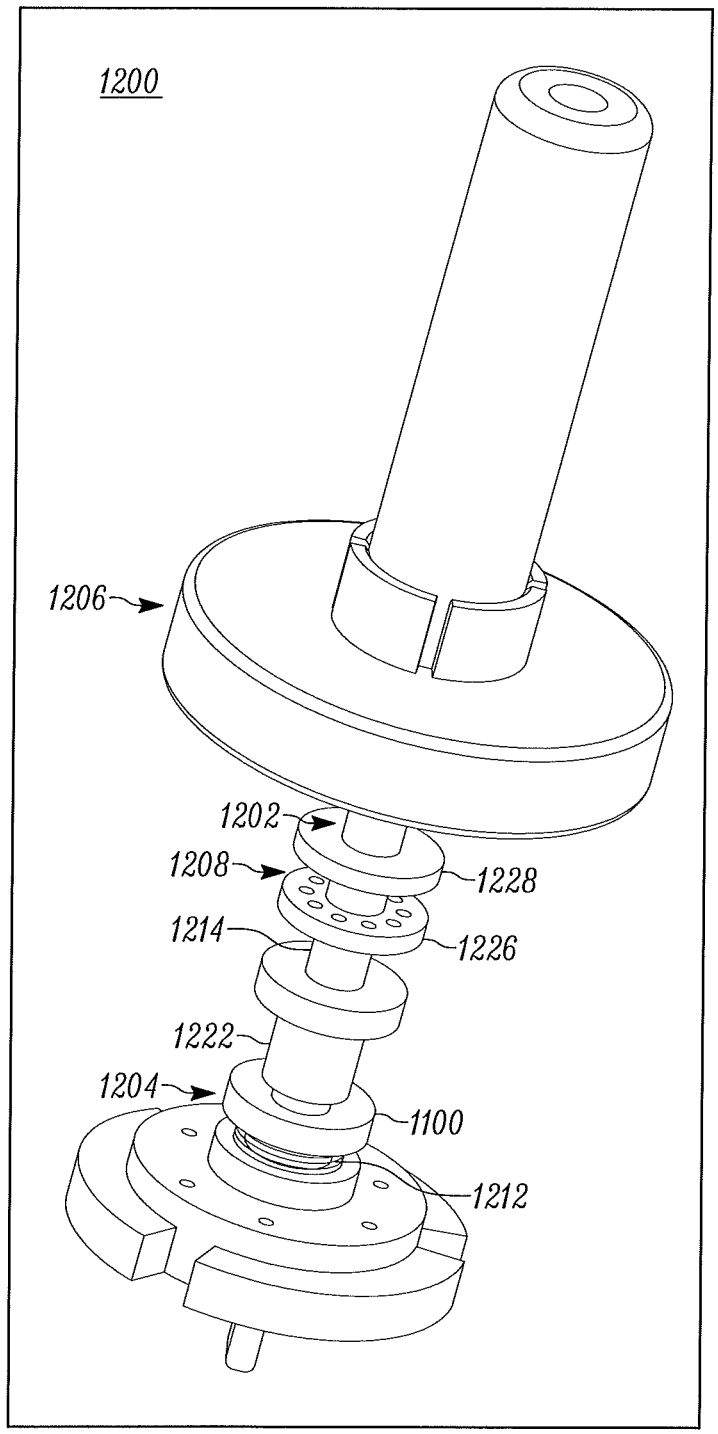
Figure 13:
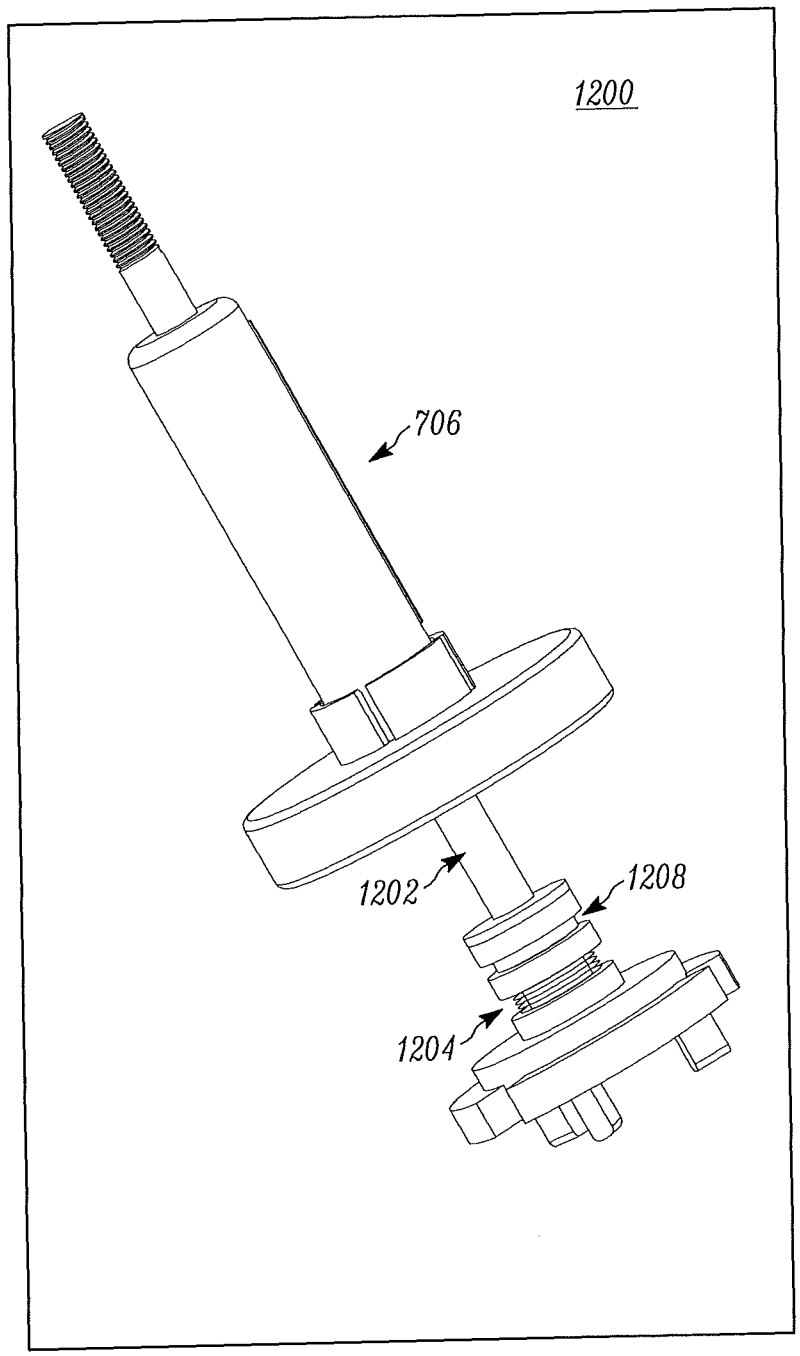

Having thus described some embodiments in general terms, reference will now be made to the accompanying drawings, which are not necessarily drawn to scale, and wherein:

FIG. 1 is a side schematic view of a printer-encoder in accordance with some embodiments;

FIGS. 2A and 2B respectively show top and side views of an example beam shaping NFC device in accordance with some embodiments;

FIG. 3 shows a cross sectional side view of the beam shaping NFC device in accordance with some embodiments;

FIG. 4 shows a close up view of the beam shaping NFC device disposed within the printer-encoder in accordance with some embodiments;

FIG. 5 shows a schematic view of a near field interrogation signal generated by the beam shaping NFC device at a near field interrogation region in accordance with some embodiments;

FIG. 6 shows an example of a beam shaping NFC device in accordance with some embodiments;

FIG. 7 shows an exploded view of an example of a spindle supported NFC device in accordance with some embodiments;

FIG. 8 shows an example of a spindle supported NFC device in accordance with some embodiments;

FIG. 9 shows an example of a spindle supported NFC device in accordance with some embodiments;

FIG. 10 shows a cross sectional side view of the spindle supported NFC device in accordance with some embodiments;

FIG. 11 shows an example of a ferromagnetic component in accordance with some embodiments;

FIG. 12 shows an exploded view of an example of a spindle supported NFC device in accordance with some embodiments; and FIG. 13 shows an example of a spindle supported NFC device in accordance with some embodiments.

DETAILED DESCRIPTION

Embodiments will be described more fully hereinafter with reference to the accompanying drawings, in which some, but not all embodiments contemplated herein are shown. Indeed, various embodiments may be implemented in many different forms and should not be construed as limited to the embodiments set forth herein; rather, these embodiments are provided so that this disclosure will satisfy applicable legal requirements. Like numbers refer to like elements throughout.

FIG. 1 shows an RFID printer-encoder 20 structured for printing and programming a series or stream of media units 24, in accordance with some embodiments. Some or all of the media units 24 may include transponders. Media units 24 may be labels, cards, etc, that are carried by a substrate liner or web 22 as shown.

Printer-encoder 20 includes several components, such as a housing 21, printhead 28, a platen roller 29, a feed path 30, a peeler bar 32, a media exit path 34, rollers 36, a carrier exit path 38, a take-up spool 40, a ribbon supply roll 41, a transceiver 42, a controller 45, a near field coupler 50, and a beam shaping NFC device 60. The web 22 is directed along the feed path 30 and between the printhead 28 and the platen roller 29 for printing indicia onto the media units 24.

Printer-encoder 20 may be configured to provide thermal transfer printing. For example, housing 21 may define an interior surface of the printer-encoder 20. A ribbon supply spool 70 may be mounted to the housing 21 on the interior surface. The ribbon supply roll 41 may be disposed on the ribbon supply spool 70 attached to the housing 21. Ribbon supply roll 41 provides a thermal ribbon that extends along a path (not shown to avoid overcomplicating FIG. 1) such that a portion of the ribbon is positioned between the printhead 28 and the media units 24. The printhead 28 heats up and presses a portion of the ribbon onto the media units 24 to print indicia. The take-up spool 40 is configured to receive and spool the used ribbon.

Ribbon supply roll 41 may include an RFID tag 62 that can be interrogated by the beam shaping NFC device 60 for purposes such as identification of the ribbon supply roll, a ribbon supply roll type, one or more characteristics of the ribbon supply roll, and/or one or more print control parameters suitable for the ribbon supply roll. The beam shaping NFC device 60 may be further configured to encode the RFID tag 62. For example, amount data defining the amount of ribbon left on the ribbon supply roll 41 may be encoded (e.g., into a memory of the RFID tag 62) such that if the ribbon supply roll were to be removed and then later reinstalled (e.g., onto printer-encoder 20 or a different device) the amount data may be retrieved from the ribbon supply roll 41 and used by the printer to determine an estimate lifetime or replacement time of the ribbon supply 41 and/or one or more of the components (e.g., ribbon 68) of the ribbon supply roll 41.

Printer-encoder 20 may be further configured to use the amount data to generate ribbon supply roll orders. For example, controller 45 may be configured provide the amount data to a remote (e.g., cloud) server configured to monitor and generate ribbon supply roll orders based on amount data received from printer-encoders. In another example, controller 45 may be configured to perform the monitoring and generate the ribbon supply orders.

In some embodiments, ribbon supply roll 41 may further include a ribbon supply core 64, a (e.g., foil) trailer 66, and a ribbon 68. The ribbon supply core 64 may be a hollow cylindrical shape to provide structural support for the ribbon supply roll 41 and to interface with the (e.g., rod-shaped) ribbon supply spool 70. The ribbon supply core 64 may be cardboard, plastic, or other nonconductive material. The foil trailer 66 may be attached to an end of the ribbon 68. The foil trailer 66 may be wrapped around the ribbon supply core 64, and the ribbon 68 may be wrapped around the foil trailer 66. RFID tag 62 may be disposed between the ribbon supply core 64 and the foil trailer 66.

Printer-encoder 20 may be configured to provide for the wireless interrogation of the RFID tag 62 of the ribbon supply roll 41 with the beam shaping near field communication (NFC) device 60. In FIG. 1, the beam shaping NFC device 60 is shown in outline to indicate that beam shaping NFC device 60 is disposed behind the ribbon supply roll 41 proximate the interior surface of housing 21. The RFID tag 62 may include a transponder configured to provide a tag identifier and/or other information stored within the RFID tag 62 (e.g., in a memory) to the printer-encoder 20. The tag identifier may be different for different ribbon supply rolls 41 and/or different ribbon supply roll types, and thus may be used by the printer-encoder 20 to configure print control parameters suitable for the ribbon supply roll 41 or ribbon supply roll type. The ribbon supply roll 41 may be disposed at the interior side of the housing 21 proximate to the beam shaping NFC device 60 such that the RFID tag 62 is located at a near field interrogation region of the beam shaping NFC device 60.

Some example print control parameters may include sensitivity, darkness and print speed. The sensitivity parameter is associated with the temperature of the printing elements of the printhead 28. The darkness parameter is associated with the amount of time that the printing elements are activated or the amount of energy used for the same amount of time. The print speed is associated with the rate that the ribbon 68 is passed through the printhead 28. In general, different ribbon supply roll types may have different print media characteristics suitable for different print control parameters. Printer-encoder 20 may include a memory configured to store (and/or may access separate data storage, such as through a network) of tag identifiers, each tag identifier associated with a set of print control parameters most suitable for ribbon supply roll 41 identified by the tag identifier. As such, in response to receiving the tag identifier via the response signal from RFID tag 62 of the ribbon supply roll 41, controller 45 may be configured to access the associated print control parameters from the memory, and to configure the components of the print-encoder 20 for print operation in accordance with the print control parameters. In some embodiments, controller 45 may be further configured to monitor the status of the ribbon supply roll 41. For example, the revolutions of the ribbon supply spool 70 may be recorded by controller 45 and used to monitor the lifespan and quality of the ribbon supply roll 41. In some embodiments, the tag identifier may be unique to each ribbon supply roll 41, and thus controller 45 may also track the placement of particular ribbon supply rolls 41 within printer-encoder 20.

As discussed in greater detail below, beam shaping NFC device 60 may be configured to generate near field interrogation signals or patterns that are concentrated in the near field interrogation region (e.g., within 10 cm or less) of the beam shaping NFC device 60. The near field interrogation signals or patterns, as used herein, refers to electric or magnetic field signals or patterns, rather than the electromagnetic field patterns associated with conventional far field RFID technologies. The near field interrogation signals may be received by RFID tag 62 disposed at the near field interrogation region. RFID tag 62 may include one or more passive or active RFID transponders. For a passive transponder, the near field interrogation signals induce current within the RFID tag 62 that causes backscattering of a response signal to the beam shaping NFC device 60. The RFID tag 62 may be configured to provide the tag identifier and/or other information stored within the transponder via the backscattering. For an active transponder, the RFID tag 62 may be configured to power (e.g., via a battery and/or other power source separate from the interrogation signals) the broadcast the tag identifier and/or other information, such as in response to receiving an interrogation signal from the beam shaping NFC device 60. Furthermore, the components of the beam shaping NFC device 60 and their arrangement may provide for reduced degradation of the near field interrogation signals when the beam shaping NFC device 60 is disposed at the (e.g., metallic) interior surface of the printer-encoder 20 defined by housing 21.

The transceiver 42 is configured for generating and transmitting RF communication signals that are broadcasted by the beam shaping NFC device 60. The transceiver 42 and the beam shaping NFC device 60 will be referred to collectively as forming at least part of a communication system. The system may be configured to communicate using any suitable communication interface, such as the serial peripheral interface (SPI). The controller 45 may be connected with the transceiver 42 and may be configured to energize the transceiver 42 to cause the beam shaping NFC device 60 to generate the near field interrogation signals. The communication system transmits the near field interrogation signal or pattern in proximity to the near field interrogation region to establish a mutual coupling between the transceiver 42 and the RFID tag 62. The transceiver 42 may also receive the response signal from beam shaping NFC device 60, and may provide the response signal to the controller 45 to identify the ribbon supply roll 41 and/or ribbon supply roll type, set suitable print control parameters, among other things.

In general, the transceiver is a device configured to generate, process, and receive electrical communication signals. One in the art would appreciate that similar devices such as transmitters, receivers, or transmitter-receivers may be used within this invention. "Transceiver" as used in the present application and the appended claims refers to the devices noted above and to any device capable of generating, processing, or receiving electrical and/or electromagnetic signals.

After printing, as shown in FIG. 1, the media unit web 22 proceeds to the media exit path 34 where the media units are typically individually removed from the web 22. For example, in one embodiment, pre-cut media units 24 may be simply peeled from the web 22 using the peeler bar 32 as shown. In other embodiments, a group of multiple media units may be peeled together and transmitted downstream to an in-line cutter for subsequent separation (not shown). Various other known media unit removal techniques may be used as will be apparent to one of ordinary skill in the art. In applications, such as the depicted embodiment, in which the media units 24 are supported by a web 22, the web 22 may be guided out of the printer-encoder 20 along the carrier exit path 38 by rollers 36 or other devices.

The transceiver 42, or a separate transceiver such as transceiver 54, may be configured for generating and transmitting RF communication signals that are broadcasted by the near field coupler 50 located proximate the media feed path 30. Thus transceiver 42 (or transceiver 54) and the near field coupler 50 may also form at least a part of a communication system that transmits a near field electromagnetic signal or pattern in proximity to a transponder operating region. The communication system may be configured to establish a mutual coupling between the transceiver and a targeted transponder of a media unit that is located in the transponder operating region. As the media web 22 proceeds along the media feed path 30 through the transponder operating region, data may be read from and written to transponders disposed on media units 24 carried by the web 22. Additional details regarding near field couplers and communications between printer-encoder 20 and transponders, applicable in some embodiments, are discussed in U.S. Pat. No. 8,306,474, titled "Multi-element RFID Coupler," which is hereby incorporated by reference in its entirety. The beam shaping NFC device 60 is configured to target RFID tag 62 of the ribbon supply roll 41 for interrogation, and to avoid interrogation of the non-targeted RFID transponders of the media units located within the interior of the housing 21 by concentrating the near field interrogation signals at the near field interrogation region of the beam shaping NFC device 60. In some embodiments, a printer including beam shaping NFC device 60 may be independent of any media unit encoding and/or interrogation. Here, the printer may not include components such as transceiver 54 and near field coupler 50.

In some embodiments, the printer-encoder 20 may further include a beam shaping NFC device configured to interrogate a media unit supply roll. For example, the media unit supply roll may be mounted to the housing 21 and may include an RFID tag, as discussed herein for the ribbon supply roll 41 and RFID tag 62. Through the beam shaping NFC device, printer-encoder 20 may be further configured to read and write data to the media unit supply roll for purposes such as identification of the media unit supply roll, a media unit supply roll, one or more characteristics of the media unit supply roll, one or more print control parameters suitable for the media unit supply roll. In another example, the beam shaping NFC device may be further configured to encode the RFID tag of the media unit supply roll, such as with data defining the amount of unused media units remaining on the media unit supply roll.

FIGS. 2A and 2B respectively show top and side views of an example beam shaping NFC device 60 in accordance with some embodiments. FIG. 3 shows a cross sectional side view of the beam shaping NFC device 60. While beam shaping NFC device 60 is discussed herein as being included in printer-encoder 20, it may also be used in other contexts where it is advantageous to concentrate near field interrogation signals within a near field interrogation region (e.g., to avoid undesired interrogation of any nearby, non-targeted transponders outside of the near field interrogation region) that are also directed away from nearby conductive components (e.g., metallic housing 20) that would otherwise cause interference or detuning of the interrogation signals (and/or response signals).

With reference to FIGS. 2A, 2B, and 3, the beam shaping NFC device 60 may include a substrate 202, a ferromagnetic component 204, a wire coil 206, a bobbin component 208, and a connector 210. The substrate 202 defines a first substrate surface 212 (as shown in FIG. 3) and a second substrate surface 214 opposite the first substrate surface 212. As discussed in greater detail below, the beam shaping NFC device 60 may be disposed within the printer-encoder 20 such that the first substrate surface 212 faces the interior side of the printer-encoder 20 (e.g., defined by housing 21) and the second substrate surface 214 faces the near field interrogation region 502 (as shown in FIG. 5) of the beam shaping NFC device 60. Substrate 202 may be formed of a nonconductive material such as plastic, fiberglass, phenolics, printed circuit board material, among other things.

As shown in FIG. 3, ferromagnetic component 204 includes a core portion 216 and a bottom flange portion 218. The core portion 216 and the bottom flange portion 218 may be formed of a single ferromagnetic piece, or alternatively, may be separate pieces that are joined together. The core portion 216 and the bottom flange portion 218 may each include a cylindrical shape, with core portion 216 including a smaller radius than the bottom flange portion 218 to define the flange structure. However, other shapes for the core portion 216 and/or bottom flange portion 218 may also be used. The ferromagnetic component 204 may be a high frequency (e.g., 13.56 MHZ range) transformer core material, such as K1 ferrite. The ferromagnetic component 204 may be mechanically attached with the second substrate surface 214 via the bottom flange portion 218, such as by a nonconductive adhesive material.

The wire coil 206 is disposed around the core portion 216 of the ferromagnetic component 204, such as in the region defined between the bottom flange portion 218 of the ferromagnetic component 204 and the bobbin top flange portion 220 of the bobbin component 208 (discussed in greater detail below). The wire coil 206 may be connected with the transceiver 42 via the contacts 210. When the controller 45 energies the transceiver 42, an interrogation signal is generated by the transceiver 42 and transmitted to the wire coil 206 via the contacts 210. The resulting current caused by the interrogation signal that travels through the wire coil 206 induces near field patterns. The ferromagnetic component 204 is structured to direct and/or shape the (e.g., magnetic) field pattern generated by the wire coil by causing the field pattern generated by the wire coil 206 to be less concentrated in the regions of the ferromagnetic component 204, and more concentrated in the other regions of the field pattern generated by the wire coil 206 (e.g., at the interrogation region of the beam shaping device 60).

The beam shaping NFC device 60 may further include the bobbin component 208 to provide a nonconductive separation between the ferromagnetic component 204 and the wire coil 206. The bobbin component 208 may be formed of a nonconductive material, such as a polymer material. With reference to FIG. 3, the bobbin component 208 may include a bobbin core portion 220 and a bobbin top flange portion 222. The bobbin core portion 220 defines a cavity configured to receive the core portion 216 of the ferromagnetic component 204. Where the core portion 216 includes a cylindrical shape, the cavity of the bobbin core portion 220 may include a corresponding cylindrical shape, and the core portion 216 of the ferromagnetic component 204 may be mechanically secured with the bobbin core portion 220 (e.g., via a nonconductive adhesive material). Once secured, the bobbin top flange portion 222 and the bottom flange portion 218 of the ferromagnetic component 204 are disposed at opposite ends of the core portion 216 of the ferromagnetic component 204. The wire coil 206 may be disposed around the bobbin core portion 220 between the bobbin top flange portion 222 and the bottom flange portion 218 of the ferromagnetic component 204.

FIG. 4 shows a close up view of beam shaping NFC device 60 disposed within printer-encoder 20 in accordance with some embodiments. Here, ribbon supply roll 41 has been removed from ribbon supply spool 70, visually exposing the beam shaping NFC device 60 (e.g., shown in outline behind ribbon supply roll 41 in FIG. 1). The printer-encoder 20 may include a holder 72 mounted to the interior surface of the housing 21 and configured to removably receive the beam shaping NFC device 60. The holder 72 may be formed of a conductive material and may secure the beam shaping NFC device 60 to housing 21.

FIG. 5 shows a schematic view of a near field interrogation pattern generated by the beam shaping NFC device 60 at a near field interrogation region, in accordance with some embodiments. As discussed above, the beam shaping NFC device 60 may be secured with the interior surface of the housing 21 such that the second substrate surface 214 of the beam shaping NFC device 60 faces perpendicular to an outer surface of the RFID tag 62. The beam shaping NFC device 60 and the RFID tag 62 oriented 90 degrees with respect to each other provides a perpendicular mutual coupling between the beam shaping NFC device 60 and the RFID tag 62.

The ferromagnetic component 204 concentrates the near field interrogation signals generated by the wire coil 206 at the near field interrogation region 502 (as shown by the arrows in FIG. 5). For example, the core portion 216 of the ferromagnetic component 204 concentrates the flux of the near field concentrations away from the interior of wire coil 206 where the core portion 216 is located. Furthermore, bottom flange portion 218 of the ferromagnetic component 204 concentrates the flux of the near field concentrations away from the metallic interior surface of the printer-encoder 20. The energy which has been concentrated away or captured from these regions are transferred or projected to the near field interrogation region 502, thereby enhancing the strength of the near field interrogation signal at the desired near field interrogation region 502 and reducing the strength at the undesirable locations, such as locations near conductive components of the printer-encoder 20.

The near field concentrations propagate through the ribbon 68 and the foil trailer 66 (not shown in FIG. 5 to avoid overcomplicating the drawing) and to the RFID tag 62 disposed between the ribbon supply core 64 and the foil trailer 66. Advantageously, the concentration of the near field interrogation signals at the near field interrogation region 502 allows for the near field interrogation signals to satisfy (e.g., exceed or meet) the activation level of the RFID tag 62 after the near field interrogation signals have propagated through the ribbon supply core 64 and the foil trailer 66 at a lower power level than would otherwise be possible. Therefore, the amount of power that is needed by the beam shaping NFC device 60 for effective interrogation of the RFID tag 62 within the ribbon supply roll 41 is reduced by the ferromagnetic component 204 via the concentration of the near field pattern at the near field interrogation region 502 and reduction of the near field pattern outside of the near field interrogation region 502

Furthermore, where the interior surface of the printer-encoder 20 is metallic, the ferromagnetic component 204 concentrates the near field interrogation signals generated by the wire coil away from the interior surface (e.g., facing the first substrate surface 212 of the housing), thereby reducing degradation of the near field interrogation signals when the beam shaping NFC device 60 is disposed at and/or near the metallic interior surface of the printer-encoder as shown in FIGS. 1 and 4. As such, via the shaping of the field pattern, the ferromagnetic component 204 concentrates the near field interrogation signals generated by the wire coil 206 toward the near field interrogation region (e.g., where the RFID tag 62 of the ribbon supply roll 41 is disposed) and away from the (e.g., conductive) interior surface of the housing 62.

The wire coil that generates the near field patterns is not limited to the coiled wiring shown in FIGS. 2A-5. In some embodiments, the wire coil 206 may be formed as wire traces on a printed circuit board (PCB) substrate. FIG. 6 shows an example beam shaping NFC device 600 in accordance with some embodiments. The wire trace coil 602 may define a center region where a ferromagnetic component 604 may be disposed through the PCB substrate 606. The discussion above regarding ferromagnetic component 204 may be applicable to ferromagnetic component 604. The PCB 606 may include an aperture configured to receive the core portion of the ferromagnetic component 604. The bottom flange portion 610 of the ferromagnetic component 604 may be disposed at the opposite surface of PCB substrate 606. In some embodiments, printer-encoder electronics 608 may also be disposed on the same PCB substrate 606, such integrated circuitry configured to perform the functionality of one or more of transceiver 42 or controller 45 as discussed above.

Spindle Supported NFC Device

Some embodiments may provide for a spindle supported near field communication (NFC) device. A spindle supported NFC device may include a beam shaping NFC device integrated with the ribbon supply spool. As discussed in greater detail below, the spindle supported NFC device may be configured to generate near field interrogation signals that maintain communication with an RFID tag of a ribbon supply roll while the RFID tag and the ribbon supply roll rotate around the spindle supported NFC device.

FIGS. 7-10 show examples of a spindle supported NFC device 700 in accordance with some embodiments. With reference to FIG. 7, which shows an exploded view, the spindle supported NFC device 700 may include a spindle 702, a beam shaping NFC device 704, a ribbon supply spool 706, and a bearing component 708.

The spindle 702 may include a spindle rod portion 714 and a spindle base portion 716. The spindle rod portion 714 may provide an axis of rotation for the ribbon supply spool 706. A ribbon supply roll with RFID tag (e.g., as shown in FIG. 5) may be mechanically secured with the ribbon supply spool 706. As such, the spindle rod portion 714 may further provide an axis rotation for the ribbon supply roll and RFID tag. The spindle base portion 716 may be configured to mount to a mounting surface, such as an internal surface of a housing of a printer or other apparatus. For example, spindle base portion 716 may be mechanically secured with the mounting surface based on screws, bolts, adhesive, or any other suitable technique.

Beam shaping NFC device 704 may include a ferromagnetic component 710 and a wire coil 712. Some or all of the discussion above regarding beam shaping NFC device 60 may be applicable to beam shaping NFC device 704, such as the material characteristics discussed above. With reference to FIG. 8, ferromagnetic component 710 may include a core portion 802 defining a core cavity. The core cavity may be structured to receive spindle rod portion 714 of spindle 702 such that spindle 702 is inserted through the core cavity.

In some embodiments, the ferromagnetic component 710 may further include one or more flange portions, such as a bottom flange portion 804 and/or a top flange portion 806. The core portion 802, the bottom flange portion 804, and/or the top flange portion 806 may be formed of a single ferromagnetic piece, or alternatively, may be separate pieces that are joined together. The core portion 802, the bottom flange portion 804, and the top flange portion 806 may each include a cylindrical shape, with core portion 802 including a smaller radius than the flange portions to define the flange structure. Alternatively, in some embodiments, ferromagnetic component 710 may include a cylindrical shape, or other non-flanged shape. A bobbin component 730 is omitted from FIG. 8, and in some embodiments may be omitted from the spindle supported NFC device as discussed in greater detail below in connection with FIGS. 11-13.

Returning to FIG. 7, the wire coil 712 may be disposed around the core portion of ferromagnetic component 710. Similar to wire coil 206 discussed above, wire coil 712 may be connected with the transceiver 42. When the controller 45 energizes the transceiver 42, an interrogation signal is generated by the transceiver 42 and transmitted to the wire coil 712. The resulting current caused by the interrogation signal that travels through the wire coil 712 induces near field patterns. The ferromagnetic component 710 is structured to direct and/or shape the (e.g., magnetic) field pattern generated by the wire coil 712 by causing the field pattern generated by the wire coil 712 to be less concentrated in the regions of the ferromagnetic component 710, and more concentrated in the other regions of the field pattern generated by the wire coil 712. For example, the near field interrogation signals may be concentrated toward a near field interrogation region of the beam shaping device 704, and away from the mounting surface to which spindle 702 may be mounted.

In some embodiments, the beam shaping NFC device 704 may further include a bobbin component 730 to provide a nonconductive separation between the ferromagnetic component 710 and the wire coil 712. The bobbin component 730 may be formed of a nonconductive material, such as a polymer material. With reference to FIG. 7, the bobbin component 730 may include a bobbin core portion. The bobbin core portion defines a bobbin cavity configured to receive the ferromagnetic component 710. Where the core portion of the ferromagnetic component 710 includes a cylindrical shape, the bobbin cavity may include a corresponding cylindrical shape, and the core portion 216 of the ferromagnetic component 204 may be mechanically secured with the bobbin core portion (e.g., via a nonconductive adhesive material). In some embodiments, the bobbin component 730 may further include a bobbin top flange portion and/or a bottom flange portion. Here, the wire coil 712 may be disposed around the bobbin core portion between the bobbin top flange portion and the bottom flange portion of bobbin component 730 as shown in FIG. 7.

The ribbon supply spool 706 may be configured to mechanically attach with a ribbon supply roll, and rotate about the spindle 702, thereby providing for the rotation of the ribbon supply roll and the RFID tag attached with the ribbon supply roll. The ribbon supply spool 706 may include a hub portion 718 and a spool portion 732. The spool portion 732 and hub portion 718 may define a spool cavity 808 (as shown in FIG. 8) and the spindle rod portion 714 of the spindle 702 may be inserted within the spool cavity 808. Spool cavity 808 may further define a region in which the beam shaping NFC device 704 may be inserted, thereby defining a protective housing for the beam shaping NFC device 704 when disposed within the spool cavity 808. In some embodiments, the spool portion 706 may further define a fin 734 configured to mechanically secure the ribbon supply roll with the ribbon supply spool 706. In some embodiments, the spool portion 732 may be made of a (e.g., conductive) metallic material and the hub portion 718 may be made of (e.g., non-conductive) plastic material.

FIGS. 9 and 10, respectively, show examples of a partially assembled spindle supported NFC device and an assembled spindle supported NFC device, in accordance with some embodiments. As shown in FIG. 9, the spool portion 706 may be slidably attached with spindle 702 such as to be capable of sliding via the spindle 702 toward the beam shaping NFC device 704. As shown in FIG. 10, when spool portion 706 is fully assembled with the beam shaping NFC device 704, the beam shaping NFC device 704 may be covered and protected from exposure.

Returning to FIG. 7, the spindle supported NFC device 700 may further include a bearing component 708 configured to facilitate rotation of the ribbon supply spool 706 around the axis defined by the spindle rod portion 732 of the spindle 702. Bearing component 708 may include a bushing 722 disposed between the core cavity of the ferromagnetic component 710 and the spindle rod portion 714 of the spindle 702. Bushing 722 may include a body portion and a flange portion as shown in FIG. 7. A washer 724 may be disposed on the body portion of the bushing 722. A bearing 726 may be disposed on the spindle rod portion 714 proximate to the flange portion of bushing 722. A washer 728 may be disposed on the spindle rod portion 714 proximate to the bearing 726, and on the opposite side of the bearing 726 relative to the flange portion of bushing 722.

The structure and features of the spindle supported NFC device 700 may allow the spindle supported NFC device 700 to be particularly adapted for near field communication with an RFID tag. With reference to FIG. 8, showing a cross sectional view, spindle supported NFC device 700 may define a near field interrogation region 810. An RFID tag (not shown in FIG. 8 to avoid overcomplicating the drawing) of a ribbon supply roll 814 may be secured to the spindle supported NFC device 700, such as for use during printer operation.

The near field interrogation region 810 may be defined based on the locations where the near field interrogation signals 812 of the beam shaping NFC device 702 are capable of coupling with and interrogating the RFID tag. Although two dotted boxes are shown in the cross sectional view of FIG. 8, the near field interrogation region 810 may be a substantially continuous region at the periphery of the beam shaping NFC device 702. Throughout the rotation of the RFID tag, the RFID tag may be maintained within the near field interrogation region 810. Advantageously, the near field interrogation signals generated by the spindle supported NFC device can thus maintain communication (e.g., without blind spots and/or intermittent signal loss) with the RFID tag as the RFID tag rotates around the spindle rod portion 714 of the spindle 702.

As discussed above, the ferromagnetic component 710 may concentrate near field interrogation signals generated by the wire coil 712 toward and/or at the near field interrogation region 810. For example, the flux $\Phi$ of the near field interrogation signals may be defined by Equation 1:

$$\Phi = IN/(R_o + R_i),$$

where $\Phi$ is the magnetic flux (Webers), IN is the number of Ampere-turns of the wire coil, $R_o$ is the reluctance or magnetic resistance of region outside of the wire coil (e.g., air), and $R_i$ is the reluctance or magnetic resistance for the region inside of the wire coil (e.g., of the ferromagnetic core 710). Based on Equation 1, the flux $\Phi$ of the near field interrogation signals is increased based on the reluctance $R_i$ of the ferromagnetic component 710 being smaller than the reluctance $R_o$ of regions outside of the coil (e.g., where a ferromagnetic component is not present), thereby concentrating the near field interrogation signals generated by the wire coil 712 toward and/or at the near field interrogation region 810. The increased flux $\Phi$ of the near field interrogation signals may help ensure that near field concentrations, after propagating through a ribbon and/or a foil trailer of the ribbon supply roll 814, satisfy an activation level of the RFID tag.

The ferromagnetic component 710 may be further configured to shield the near field interrogation signals away from various nearby components may otherwise cause interference and degradation of the magnetically sensitive near field patterns passed between the spindle supported NFC device and RFID tag. For example and with reference to FIG. 8, the spindle rod portion 714 of spindle 702 may be a metallic material that is shielded from the near field interrogation signals 812 by the ferromagnetic component 710.

In some embodiments, the ferromagnetic component 710 may be configured to concentrate the near field interrogation signals away from the spindle base portion 716 of spindle 702 and/or the (e.g., metallic) mounting surface to which the spindle base portion 716 is mounted. For example, the ferromagnetic component 710 may further include a bottom flange portion 804 and/or a top flange portion 806 as shown in FIGS. 8 and 11. The bottom flange portion 804 of the ferromagnetic component 710 may promote the concentration of the near field interrogation signals away from spindle base portion 716 and/or the mounting surface. Similarly, the top flange portion 806 of the ferromagnetic component 710 may promote the concentration of the near field interrogation signals away from various components located above the ferromagnetic component 710 that may be metallic or otherwise include metallic elements, such as bearing component 708. For example, bushing 722, washer 728, and/or bearing 726 (e.g., the ball bearings) may be of a metallic material. In some embodiments, a nonconductive washer 724 may be disposed between the ferromagnetic component 710 and the metallic bushing 722 to electrically isolate the ferromagnetic component 710 away from the metallic portions of the bearing component 708.

FIG. 11 shows an example of a ferromagnetic component 1100 in accordance with some embodiments. The ferromagnetic component 1100 is an example of a ferromagnetic component that may be included within a spindle supported NFC device. The ferromagnetic component 1100 may include a core portion 1102, a top flange portion 1104, a bottom flange portion 1106, and a core cavity 1108.

FIG. 12 shows an exploded view of an example of a spindle supported NFC device 1200 including the ferromagnetic component 1100, and FIG. 13 shows an assembled view of the spindle supported NFC device 1200, in accordance with some embodiments. Spindle supported NFC device 1200 may include a spindle 1202, a beam shaping NFC device 1204, a ribbon supply spool 706, and a bearing component 1208. The beam shaping NFC device 1204 may include a flanged ferromagnetic component 1100 and a wire coil 1212 wound around the core portion 1102 between the top flange portion 1104 and the bottom flange portion 1106.

Unlike the beam shaping NFC device 704 of FIG. 7, however, beam shaping NFC device 1200 does not include a bobbin component. The bearing component 1208 may include a bushing 1222 and a bearing 1226. A single washer 1228 is disposed on the spindle rod portion 1214 of the spindle 1202 proximate to the bearing 1226.

CONCLUSION

Many modifications and other embodiments will come to mind to one skilled in the art to which these embodiments pertain having the benefit of the teachings presented in the foregoing descriptions and the associated drawings. For example, the ferromagnetic core discussed herein is particularly adapted for concentrating near field interrogation signals based on the relative positions of the beam shaping NFC device and the RFID tag, but other ferromagnetic core structures may be appropriate based on beam shaping need. In another example, the beam shaping NFC device discussed herein may be used within devices or apparatuses other than printer-encoders, such as non-encoding printers, mobile devices, desktop devices, among other things. In yet another example, the beam shaping NFC device may be used during ribbon supply roll manufacturing to write and verify part numbers, such as the ribbon supply type being wound to a (e.g., universal) ribbon supply core. Therefore, it is to be understood that embodiments and implementations are not to be limited to the specific example embodiments disclosed and that modifications and other embodiments are intended to be included within the scope of the appended claims. Although specific terms are employed herein, they are used in a generic and descriptive sense only and not for purposes of limitation.

That which is claimed:

1. A spindle supported near field communication (NFC) device, comprising:
   a spindle configured to mount to a mounting surface; and
   a beam shaping NFC device including:
      a ferromagnetic component including:
         a core portion, wherein the core portion defines a core cavity and the spindle is inserted within the core cavity;
         a first flange portion; and
         a second flange portion; and
      a wire coil disposed around the core portion between the first flange portion and the second flange portion, wherein the ferromagnetic component concentrates near field interrogation signals generated by the wire coil toward a near field interrogation region and away from the mounting surface;
   a ribbon supply spool configured to mechanically attach with a ribbon supply roll, the ribbon supply spool to rotate around the spindle; and
   a bearing component configured to facilitate rotation of the ribbon supply spool around a spindle rod portion of the spindle, the bearing component including:
      a bushing disposed between an exterior surface of the core cavity of the ferromagnetic component and the spindle;
      a first washer disposed around the bushing;
      a second washer disposed around the spindle; and
      a bearing disposed around the spindle between the bushing and the second washer.

2. The spindle supported NFC device of claim 1, wherein the near field interrogation signals maintain communication with a radio frequency identification (RFID) tag while the RFID tag rotates around the spindle and within the near field interrogation region.

3. The spindle supported NFC device of claim 1, wherein the first flange portion of the ferromagnetic component promotes the concentration of the near field interrogation signals away from the mounting surface.

4. The spindle supported NFC device of claim 1, wherein the ferromagnetic component promotes the concentration of the near field interrogation signals away from the spindle.

5. The spindle supported NFC device of claim 1, wherein:
   the beam shaping NFC device further includes a nonconductive bobbin component including a bobbin core portion defining a bobbin cavity;
   the core portion of the ferromagnetic component is disposed within the bobbin cavity; and
   the wire coil is disposed around the bobbin core portion.

6. The spindle supported NFC device of claim 1, the ribbon supply roll including an RFID tag, wherein the near field interrogation signals maintain communication with the RFID tag while the RFID tag rotates around the spindle and within the near field interrogation region.

7. The spindle supported NFC device of claim 6, wherein:
   the ribbon supply roll further includes:
      a ribbon supply core;
      a ribbon; and
      a foil trailer attached to an end of the ribbon, wherein the foil trailer is wrapped around the ribbon supply core and the ribbon is wrapped around foil trailer; and the RFID tag is disposed between the ribbon supply core and the foil trailer; and
   the ferromagnetic component concentrates the near field interrogation signals generated by the wire coil at the near field interrogation region such that the near field interrogation signals, after propagating through the ribbon and foil trailer, satisfy an activation level of the RFID tag.

8. The spindle supported NFC device of claim 1, wherein:
   the ribbon supply spool defines a spool cavity and the beam shaping NFC device is disposed within the spool cavity; and
   the ribbon supply spool defines a protective housing for the beam shaping NFC device when the beam shaping NFC device is disposed within the spool cavity.

9. The spindle supported NFC device of claim 1, wherein:
   the ribbon supply spool includes a hub portion and a spool portion;
   the spool portion defines a spool cavity and the spindle is inserted within the spool cavity; and
   the spool portion further includes a fin configured to mechanically secure the ribbon supply roll with the ribbon supply spool.

10. A printer, comprising:
   a housing defining an interior surface of the printer;
   a spindle supported NFC device mechanically secured with the interior surface, the spindle supported NFC device including:
      a spindle configured to mount to the interior surface of the printer; and
      a beam shaping NFC device including:
         a ferromagnetic component including a core portion, a first flange portion and a second flange portion, wherein the core portion defines a core cavity and the spindle is inserted within the core cavity; and
         a wire coil disposed around the core portion between the first and second flange portions of the ferromagnetic component, wherein the ferromagnetic component concentrates near field interrogation signals generated by the wire coil toward a near field interrogation region and away from the interior surface of the printer;
a ribbon supply spool configured to mechanically attach with a ribbon supply roll, the ribbon supply spool to rotate around the spindle; and
a bearing component configured to facilitate rotation of the ribbon supply spool around the spindle, wherein the bearing components includes:
  a bushing disposed between the exterior surface of the core cavity of the ferromagnetic component and the spindle;
  a first washer disposed around the bushing;
  a second washer disposed around the spindle; and
  a bearing disposed around the spindle between the bushing and the second washer.

11. The printer of claim 10, wherein the near field interrogation signals maintain communication with an RFID tag located while the RFID tag rotates around the spindle within the near field interrogation region.

12. The printer of claim 10, wherein the first flange portion of the ferromagnetic component promotes the concentration of the near field interrogation signals away from the interior surface of the printer.

13. The printer of claim 10, wherein the ferromagnetic component promotes the concentration of the near field interrogation signals away from the spindle.

14. The printer of claim 10, wherein:
the beam shaping NFC device further includes a nonconductive bobbin component including a bobbin core portion defining a bobbin cavity;
the core portion of the ferromagnetic component is disposed within the bobbin cavity; and
the wire coil is disposed around the bobbin core portion.

15. The printer of claim 10, the ribbon supply roll including an RFID tag, wherein the near field interrogation signals maintain communication with the RFID tag while the RFID tag rotates around the spindle and within the near field interrogation region.

16. The printer of claim 15, wherein:
the ribbon supply roll further includes:
  a ribbon supply core;
  a ribbon; and
  a foil trailer attached to an end of the ribbon, wherein the foil trailer is wrapped around the ribbon supply core and the ribbon is wrapped around foil trailer; and
the RFID tag is disposed between the ribbon supply core and the foil trailer; and
the ferromagnetic component concentrates the near field interrogation signals generated by the wire coil at the near field interrogation region such that the near field interrogation signals, after propagating through the ribbon and foil trailer, satisfy an activation level of the RFID tag.

17. The printer of claim 10, wherein:
the ribbon supply spool includes a hub portion and a spool portion;
the spool portion defines a spool cavity and the spindle is inserted within the spool cavity; and
the spool portion further defines a fin configured to mechanically secure the ribbon supply roll with the ribbon supply spool.

18. A spindle supported near field communication (NFC) device, comprising:
a spindle configured to mount to a mounting surface; and
a beam shaping NFC device including:
  a ferromagnetic component including:
    a core portion, wherein the core portion defines a core cavity and the spindle is inserted within the core cavity;
    a first flange portion; and
    a second flange portion; and
  a wire coil disposed around the core portion between the first flange portion and the second flange portion, wherein the ferromagnetic component concentrates near field interrogation signals generated by the wire coil toward a near field interrogation region and away from the mounting surface;
a ribbon supply spool configured to mechanically attach with a ribbon supply roll, the ribbon supply spool to rotate around the spindle, the ribbon supply roll including an RFID tag, wherein the near field interrogation signals maintain communication with the RFID tag while the RFID tag rotates around the spindle and within the near field interrogation region, wherein:
the ribbon supply roll further includes:
  a ribbon supply core;
  a ribbon; and
  a foil trailer attached to an end of the ribbon, wherein the foil trailer is wrapped around the ribbon supply core and the ribbon is wrapped around foil trailer;
the RFID tag is disposed between the ribbon supply core and the foil trailer; and
the ferromagnetic component concentrates the near field interrogation signals generated by the wire coil at the near field interrogation region such that the near field interrogation signals, after propagating through the ribbon and foil trailer, satisfy an activation level of the RFID tag.

19. A printer, comprising:
a housing defining an interior surface of the printer;
a spindle supported NFC device mechanically secured with the interior surface, the spindle supported NFC device including:
  a spindle configured to mount to the interior surface of the printer; and
  a beam shaping NFC device including:
    a ferromagnetic component including a core portion, a first flange portion and a second flange portion, wherein the core portion defines a core cavity and the spindle is inserted within the core cavity; and
    a wire coil disposed around the core portion between the first and second flange portions of the ferromagnetic component, wherein the ferromagnetic component concentrates near field interrogation signals generated by the wire coil toward a near field interrogation region and away from the interior surface of the printer;
a ribbon supply spool configured to mechanically attach with a ribbon supply roll, the ribbon supply spool to rotate around the spindle, the ribbon supply roll including an RFID tag, wherein the near field interrogation signals maintain communication with the RFID tag while the RFID tag rotates around the spindle and within the near field interrogation region, wherein:
the ribbon supply roll further includes:
  a ribbon supply core;
  a ribbon; and
  a foil trailer attached to an end of the ribbon, wherein the foil trailer is wrapped around the ribbon supply core and the ribbon is wrapped around foil trailer;

the RFID tag is disposed between the ribbon supply core and the foil trailer; and the ferromagnetic component concentrates the near field interrogation signals generated by the wire coil at the near field interrogation region such that the near field interrogation signals, after propagating through the ribbon and foil trailer, satisfy an activation level of the RFID tag.

\* \* \* \* \*